(12) United States Patent
Haririan

(10) Patent No.: US 11,914,465 B2
(45) Date of Patent: Feb. 27, 2024

(54) TOOL-GUIDED COMPUTING TRIAGE PROBE

(71) Applicant: Red Hat, Inc., Raleigh, NC (US)

(72) Inventor: Vida Haririan, Westford, MA (US)

(73) Assignee: Red Hat, Inc., Raleigh, NC (US)

(\*) Notice: Subject to any disclaimer, the term of this patent is extended or adjusted under 35 U.S.C. 154(b) by 57 days.

(21) Appl. No.: 17/559,709

(22) Filed: Dec. 22, 2021

(65) Prior Publication Data

US 2023/0195560 A1 Jun. 22, 2023

(51) Int. Cl.
G06F 11/00 (2006.01)
G06F 11/07 (2006.01)
G06F 11/32 (2006.01)
G06N 20/00 (2019.01)

(52) U.S. Cl.
CPC ...... *G06F 11/0793* (2013.01); *G06F 11/0772* (2013.01); *G06F 11/0787* (2013.01); *G06F 11/327* (2013.01); *G06N 20/00* (2019.01)

(58) Field of Classification Search
None
See application file for complete search history.

(56) References Cited

U.S. PATENT DOCUMENTS

| | | |
|---|---|---|
| 7,934,126 B1 | 4/2011 | Bennett et al. |
| 10,013,333 B2 | 7/2018 | Wood et al. |
| 11,521,080 B2 * | 12/2022 | Mueller .................. G06N 5/045 |
| 2017/0213303 A1 * | 7/2017 | Papadopoulos ....... G06F 16/248 |
| 2019/0327160 A1 | 10/2019 | Sivaprakasam et al. |
| 2020/0097350 A1 | 3/2020 | Pitchaimani |
| 2023/0073644 A1 * | 3/2023 | Thakkar .............. G06F 11/0793 |

OTHER PUBLICATIONS

Google Scholar/Patents search—text refined (Year: 2023).*
Backtrace I/O, Inc., Backtrace for CI or CD, (2014).
Nitika Mehta, How to Triage Test Failures in a Continuous Delivery Lifecycle, (Oct. 30, 2018).
Fetahi Wuhib, Yves Lemieux, Automating Fault Detection for Management Systems using ML, (Mar. 04, 2019).
Gustavo Pérez Alvarez, Real-Time Fault Detection and Diagnosis Using Intelligent Monitoring and Supervision Systems (Feb. 5, 202).

* cited by examiner

*Primary Examiner* — Christopher S McCarthy

(57) ABSTRACT

A tool-guide triage probe provides error triaging by: detecting an error in a computing deployment with incomplete configuration data known; identifying a plurality of historic solutions for the error from computing deployments with matching configuration data; determining, via a machine learning model, an initial ranking of the plurality of historic solutions based on resource usages; performing an initial highest ranked solution on the computing deployment and appending performance thereof to a triage report; in response to determining that the initial highest ranked solution was unsuccessful, determining, via the machine learning model, a subsequent ranking of the plurality of historic solutions; performing a subsequent highest ranked solution on the computing deployment and appending performance thereof to the triage report; and transmitting the triage report identifying that the initial highest ranked solution and the subsequent highest ranked solution were performed on the computing deployment.

18 Claims, 6 Drawing Sheets

TOOL-GUIDED COMPUTING TRIAGE PROBE

BACKGROUND

Modern software is often drafted by a team of developers for use across different computing environments with various hardware, firmware, and pre-existing software packages deployed thereon. As the software is developed, the developers add code, remove code, and edit existing code, which may introduce errors into the software that affect the operation of the computing deployment. Similarly, changes to the hardware in the computing environment, or the use of different hardware in a production environment versus a test environment, can affect the operation of the software in the computing deployment.

SUMMARY

The present disclosure provides a new and innovative tool-guided computing triage probe that offers improvements to in computing efficiency (particularly in computing testing triage efficiency), accuracy, and among other benefits. In one example, a method is provided that comprises detecting an error to triage in a computing deployment for which incomplete configuration data are known; identifying a plurality of historic solutions for the error in other computing deployments with matching configuration data to the incomplete configuration data; determining, via a machine learning model, an initial ranking of the plurality of historic solutions based at least in part on resource usages for performing individual solutions of the plurality of historic solutions; performing an initial highest ranked solution, according to the initial ranking, on the computing deployment; appending performance of the initial highest ranked solution to a triage report; in response to determining that the initial highest ranked solution was unsuccessful in resolving the error, determining, via the machine learning model, a subsequent ranking of the plurality of historic solutions for the error based at least in part on the resource usages for performing the individual solutions of the plurality of historic solutions; performing a subsequent highest ranked solution, according to the subsequent ranking, on the computing deployment; appending performance of the subsequent highest ranked solution to the triage report; and transmitting the triage report identifying that the initial highest ranked solution and the subsequent highest ranked solution were performed on the computing deployment.

In one example, a memory device is provided that includes instructions that when executed by a processor perform operations comprising: detecting an error to triage in a computing deployment for which incomplete configuration data are known; identifying a plurality of historic solutions for the error in other computing deployments with matching configuration data to the incomplete configuration data; determining, via a machine learning model, an initial ranking of the plurality of historic solutions based at least in part on resource usages for performing individual solutions of the plurality of historic solutions; performing an initial highest ranked solution, according to the initial ranking, on the computing deployment; appending performance of the initial highest ranked solution to a triage report; in response to determining that the initial highest ranked solution was unsuccessful in resolving the error, determining, via the machine learning model, a subsequent ranking of the plurality of historic solutions for the error based at least in part on the resource usages for performing the individual solutions of the plurality of historic solutions; performing a subsequent highest ranked solution, according to the subsequent ranking, on the computing deployment; appending performance of the subsequent highest ranked solution to the triage report; and transmitting the triage report identifying that the initial highest ranked solution and the subsequent highest ranked solution were performed on the computing deployment.

In one example, a system is provided that comprises a processor in communication with a solution database; and a memory device including instructions that when executed by the processor perform operations comprising: detecting an error to triage in a computing deployment for which incomplete configuration data are known; identifying, from the solution database, a plurality of historic solutions for the error in other computing deployments with matching configuration data to the incomplete configuration data; determining, via a machine learning model, an initial ranking of the plurality of historic solutions based at least in part on resource usages for performing individual solutions of the plurality of historic solutions; performing an initial highest ranked solution, according to the initial ranking, on the computing deployment; appending performance of the initial highest ranked solution to a triage report; in response to determining that the initial highest ranked solution was unsuccessful in resolving the error, determining, via the machine learning model, a subsequent ranking of the plurality of historic solutions for the error based at least in part on the resource usages for performing the individual solutions of the plurality of historic solutions; performing a subsequent highest ranked solution, according to the subsequent ranking, on the computing deployment; appending performance of the subsequent highest ranked solution to the triage report; and transmitting the triage report identifying that the initial highest ranked solution and the subsequent highest ranked solution were performed on the computing deployment Additional features and advantages of the disclosed methods, devices, and/or systems are described in, and will be apparent from, the following Detailed Description and the Figures.

DETAILED DESCRIPTION

Figure 1:
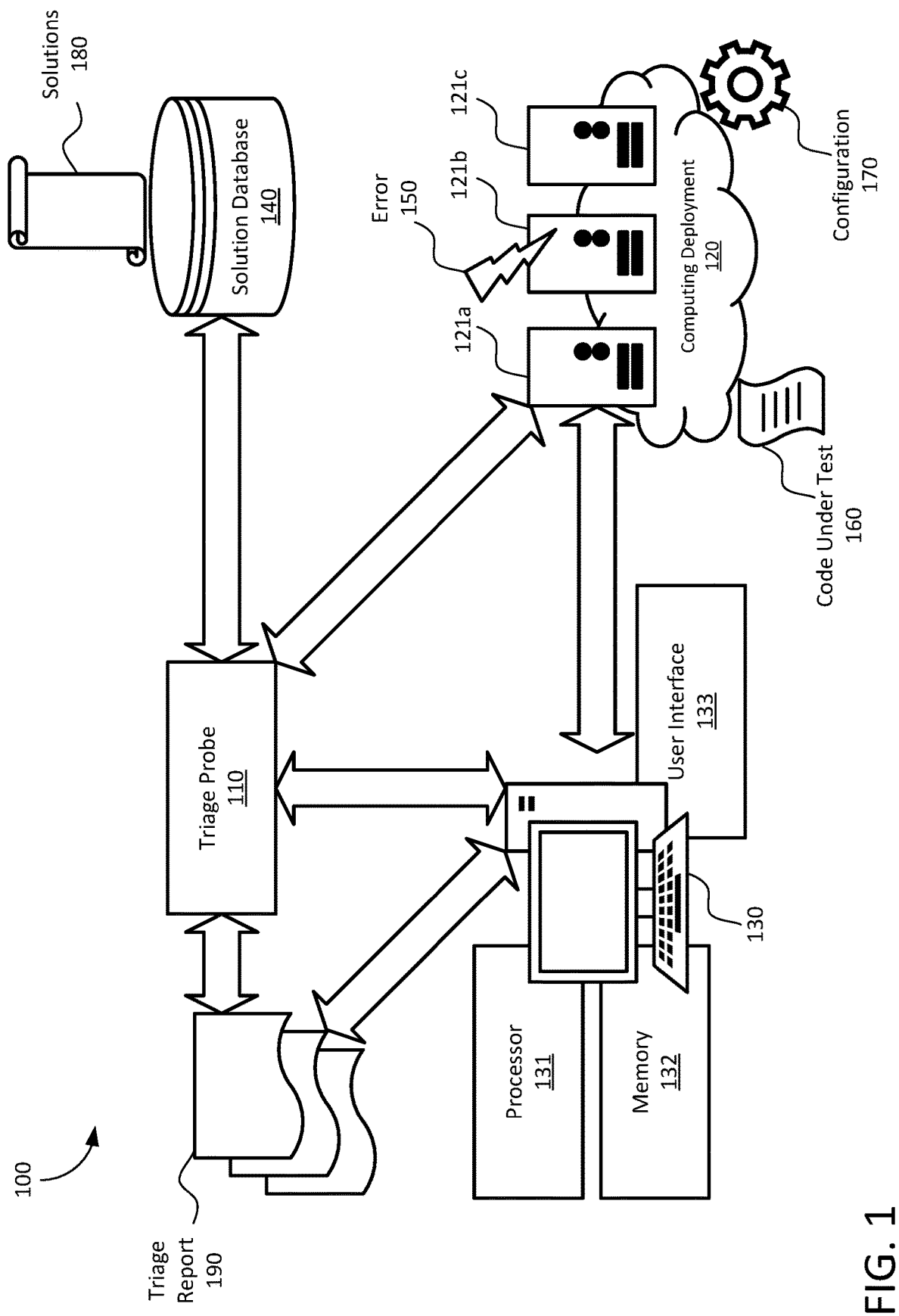
FIG. 1 illustrates a computing environment, according to various examples of the present disclosure.

Errors in a computing deployment with an application can be the result of changes in the computing environment (e.g., the hardware and firmware/software used to run and manage the hardware), changes in the code of the application being developed in that environment, or combinations thereof.

Although developers or testers may implement various best practices to mitigate the effect and number of errors produced during development, some factors are outside of the developer's control, and at least some bugs or errors are generally expected to occur during the development process.

As software applications are increasingly being developed for a wider array of computing environments (e.g., local deployments, cloud deployments, edge deployments, and combinations thereof) and a greater number of developers are tasked to work together to create and maintain the software application, identifying a root cause and a solution for an error (or multiple co-pending errors) is also becoming increasingly difficult. Accordingly, the developers may not be able to test every use-case of the applications, and when developing for a remote computing environment (e.g., for a cloud, edge, cloud-hybrid, or edge-hybrid deployment), the developers may not have control over the hardware and configuration thereof used to run the software applications being developed. Additionally or alternatively, when the developers use a continuous integration (CI) test environment to develop a software application, in which code changes are periodically merged into a central repository to automatically build and test the software in the computing environment, the code-merging process can obscure what changes were actually made to the code currently under test. Additionally, the changes imparted by the code-merging and CI infrastructure can obscure potential anomalies in code under test. Accordingly, the root cause of an error can be unclear, and the changes needed to resolve the error can also be unclear.

The present disclosure therefore provides a tool-guided triage probe for use in resolving errors in a computing deployment when incomplete information related to the error or computing environment is known or when the developer seeking to resolve the error has incomplete control over the computing deployment. By observing historical solutions and Root Cause Analysis (RCA) data points applied to resolve similar errors in similar computing deployments, the triage probe offers developers a guided process via an interactive pathway to resolve the error. Rather than relying on static checklists of potential solutions to attempt, the triage probe continuously reevaluates potential resolution pathways as developers report success rates and the computing resources used to attempt various solutions. Using these historic attempts, the triage probe can identify an efficient pathway to resolve a current error, building on past experience.

Additionally, the triage probe develops a triage report, which may be an immutable record, that indicates the solutions attempted by a developer to resolve the current error and the footprint of the error (e.g., an error type and the affected systems). This triage report may be used in updating the triage probe for identifying more efficient resolution pathways, be used by the developer as a record of the resolution process, or may be provided to an escalation service when the developer cannot personally resolve the error.

Accordingly, the present disclosure improves the efficiency of the computing devices under test and the computing devices used in error triaging by reducing the time and processor cycles devoted to recreating errors, resolving errors, reducing the downtime of the systems affected by the error, and returning the computing environment back to normal operations more quickly, among other benefits.

FIG. 1 illustrates a computing environment 100, according to various examples of the present disclosure. A triage probe 110 is provided in communication with a computing deployment 120, a developer system 130, and a solution database 140. The computing deployment 120 includes one or more deployment systems 121a-c (generally or collectively, deployment system 121) used to run the code under test 160, which is experiencing an error 150, and various other deployment systems 121 that interact with or are co-managed with the affected development system 121. In various examples, the error 150 may be the result of a change to the code under test 160 or to the configuration 170 of the computing deployment 120, which may affect the operation of the deployment system 121 running the code under test 160, or an associated development system 121. For example, although the error 150 is shown in FIG. 1 as affecting a second deployment system 121b, the code under test 160 may be running on the first deployment system 121a, but affecting how the first deployment system 121a interacts with the second deployment system 121b as a target system, and causes the error 150 to occur on the targeted system.

A user may attempt to resolve the error 150 by adjusting the code under test 160, the configuration 170, or combinations thereof via a user interface 133 provided on a developer system 130. For example, a developer may upload a new version of the code under test 160 from the developer system 130 to the computing deployment 120 or signal the computing deployment 120 to roll back to a previous version of the code under test 160 (e.g., as last-known-good version). In another example, a developer may power cycle a deployment system 121, select a different deployment system 121 in the computing deployment 120 to run the code under test 160, or the like to resolve the error 150. The developer system 130, or the triage probe 110, may also query various developer systems 121 for additional information about the configuration 170 thereof to better understand the conditions leading to the error 150.

The developer system 130 and the deployment systems 121 may be representative of any virtual or physical computing system and combinations thereof including cloud deployments, desktop computers, laptop computers, tablets, smartphones, server computers, etc., that include a processor 131 and a memory device 132 that stores instructions that when executed by the processor 131, cause the computing system to perform various specified operations, including those described in the present disclosure. The triage probe 110 that guides the developer through the error resolution process, may be implemented on one or more of the developer system 130, a deployment system 121, or a different computing device separate from the developer system 130 and the computing deployment 120.

When the triage probe is enabled and an error 150 or an error/bug report invokes the triage probe 110, the triage probe 110 gathers a footprint of the computing deployment 120, which may include some or all of the configuration data of the computing deployment 120 and a state of the code under test 160. The triage probe 110 accesses a solution database 140 that includes historically seen (attempted) solutions 180 and RCA reports to identify various solutions 180 for similar errors historically seen (and potentially resolved) in other computing deployments (including earlier versions of the current computing deployment 120). For example, the configuration data may indicate that "error A occurred in node B", and omit other details of the configuration 170 of the computing deployment 120, provide a snapshot of the current state of the computing deployment 120, and various other examples with various levels of specificity.

Because the configuration data may be incomplete or the configuration 170 may otherwise not fully known to the triage probe 110 when accessing the solution database 140, a "similar" error or set of configuration data may include exact matches and partial matches to the current error or configuration 170. For example, the triage probe 110 may identify all solutions 180 that share an exact match for the error 150 (e.g., connection time out on port A) that occur on deployment systems 121 with inexact matches with the available configuration data (e.g., using different versions of the same operating system, based on known feature A and independent of unknown feature B). In another example, the triage probe 110 may identify all solutions 180 that share an inexact match for the error 150 (e.g., network connectivity errors) in addition to exact matches for the error 150 (e.g., a port forwarding error on a specified port). Stated differently, the triage probe 110 identifies historic solutions 180 to historic errors sharing at least a category or type with the current error 150 that occurred on historically observed computing deployments sharing at least one configuration setting or configuration datum with the computing deployment 120 experiencing the current error 150.

In various examples, the triage probe 110 locks or otherwise reserves some or all of the computing environment and resources involved with an error 150, allowing the user interactive access to system under test console to execute suggested triage commands when requested by the triage probe 110. In various examples, the results are recorded by the triage probe 110 and are used to determine next triage steps to suggest. Which systems and resources are locked or reserved may be situationally determined by the triage probe 110 to prevent other processes from overwriting the system state that led to the error, which may include reserving the resources for use by the triage probe 110 while the triage process is running.

The triage probe 110 identifies which potential solution 180 of the plurality of returned solutions 180 from the solution database 140 to provide to the developer system 130. In various examples, the triage probe 110 receives feedback and additional configuration data from the developer system 130 and/or the computing deployment 120 as various solutions 180 are attempted to identify the next potential solution 180 to recommend when an earlier proposed solution is unsuccessful at resolving the error 150. The process of identifying potential solutions 180, determining which one solution 180 to recommend next, evaluating whether the recommended solution 180 was successful, and (potentially) iterating until a successful solution 180 is implemented or the error resolution process is escalated to a third party (e.g., an escalation service or subject matter expert) is discussed in greater detail in regard to FIG. 5.

As part of recommending and monitoring what solutions 180 are attempted to resolve the error 150, the triage probe 110 generates a triage report 190. The triage report 190 identifies which solutions 180 have been attempted, when those solutions 180 were attempted relative to one another, the as-then-known configuration data in the computing deployment 120 when the solutions 180 were recommended, how long the solution 180 took to attempt, and what computing resources were consumed or otherwise made unavailable for other users when attempting the solution 180, and various other details of the computing deployment 120. In some examples, the triage report 180 include some or all of the code under test 160, or a change log from the last-known good version of the code under test 160. The triage report 190 may be provided to an escalation service or the developer to avoid repeating unsuccessful solutions 180 and/or as a record that various solutions 180 were attempted. Additionally, the triage probe 110 may provide the triage report 190 for inclusion in the solution database 140 to track and identify trends in what solutions 180 have been successful (not not), to thereby identify more effective and efficient recommendations for handling future errors similar to the current error 150.

Figure 2:
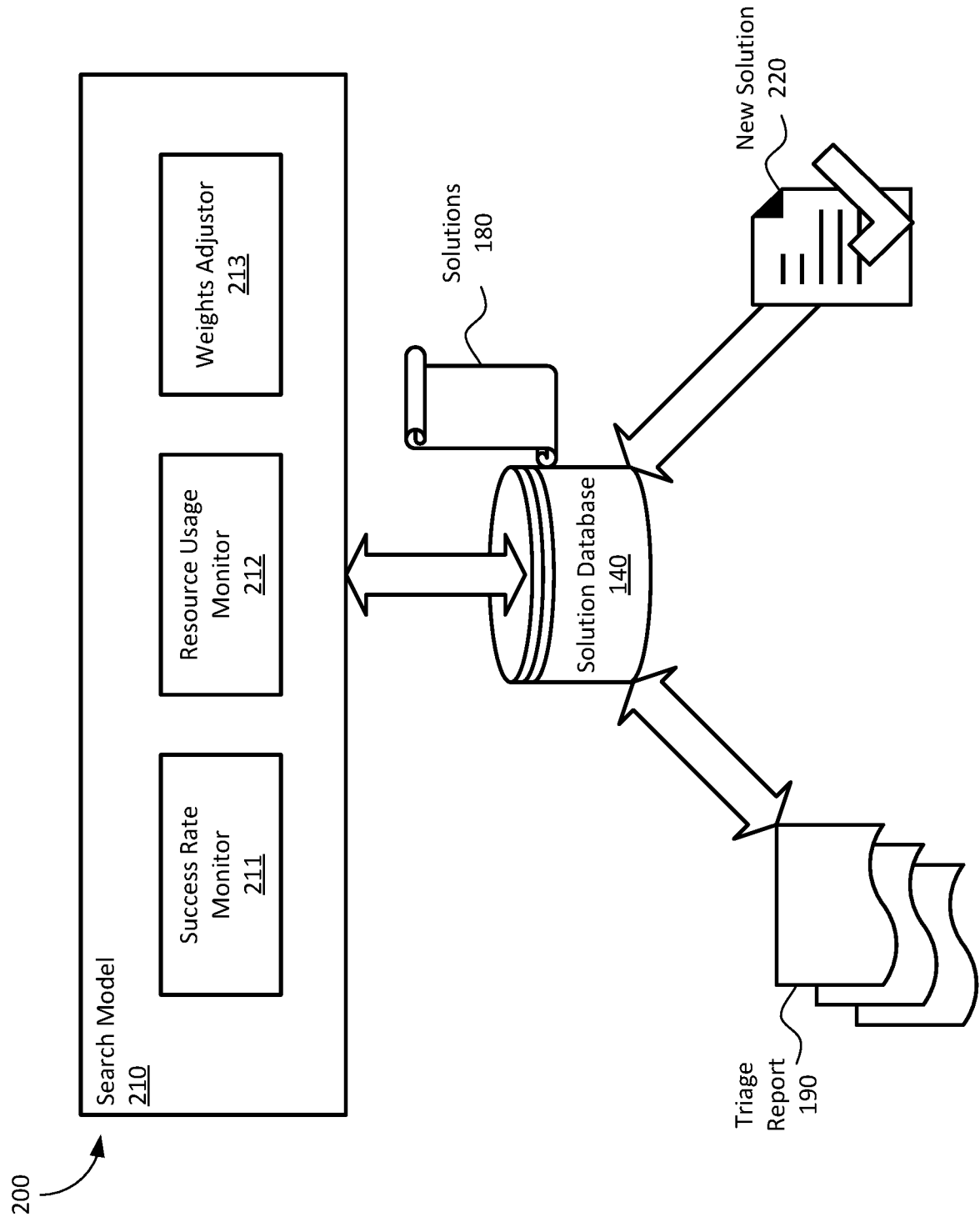
FIG. 2 illustrates a search architecture, according to various examples of the present disclosure.

FIG. 2 illustrates a search architecture 200, according to various examples of the present disclosure. The search architecture 200 includes a search model 210 used by the triage probe 110 to identify potentially relevant solutions 180 to a reported error 150, and select the "best" or "optimal" solution 180 for the given constraints set by the developer in resolving the error 150. In various embodiments, the search model 210 is a machine learning model that is trained and developed to identify the historic solutions 180 from the solution database 140 to efficiently resolve various errors 150 and identify trends in solution efficacy to thereby adjust potential chains of suggested solutions 180 (also referred to as resolution pathways). The developer may select various machine learning models for use in the search model 210, such as, for example, artificial neural networks, decision trees, support vector machines, genetic algorithms, Bayesian networks, or the like.

The solution database 140 may be populated with historic solutions 180 from previous attempts to solve various errors 150 in various computing deployments 120, and may be augmented with the results of attempting various solutions 180 indicated in triage reports 190 received from various users. Additionally, an escalation service may provide or curate new solutions 220, either as a follow up to a triage report 190 that indicated that no successful solution 180 could be found or as a recommended solution for a newly implemented system, software program, or the like.

The search model 210 includes a success rate monitor 211 that identifies from the triage reports 190 a frequency or rate that various attempted solutions 180 are successful in resolving particular errors 150. The success rate monitor 211 uses the submitted triage reports 190 to identify which solutions 180 were successful (or unsuccessful) and under which circumstances those solutions 180 were attempted to resolve various errors 150. For example, a first solution 180 may be successful in resolving a given error 150 A % of the time, while a second solution 180 may be successful in resolving that given error 150 B % of the time. Accordingly, the success rate monitor 211 provides semi-supervised feedback to train the search model 210 to identify when various solutions 180 are more successful or less successful in resolving various errors 150 affecting the computing deployments 120 with associated configuration data. The success rate monitor 211 thereby continuously improves the precision of the triage probe 110 to match future occurrences of like errors to successful solutions for the current error 150.

In various examples, the total percentage for success for a set of identified solutions 180 may exceed 100%, as multiple solutions 180 can solve the same error 150, or may be less than 100%, as some errors 150 may not be associated with a successful resolution in each case. Additionally, even when the set of identified solutions 180 meets or exceeds 100% (e.g., A %+B %>100%), edge cases may exist where no successful solution 180 is known due to potential overlap between the successfulness of the identified solutions 180 (e.g., when $error_1$ is resolvable by $soultion_1$ 70% of the time and $solution_2$ 50% of the time). Accordingly, the search model 210 does not use the success rate monitor 211 to merely identify a resolution pathway from the highest success rate to the lowest success rate (e.g., from the solutions with A % to B % to C % success rates where A>B>C), but as one factor in evaluating what solutions 180 to recommend the developer to attempt, and in what order.

The search model 210 includes a resource usage monitor 212 that identifies from the triage reports 190 what computing resources were consumed or otherwise made unavailable when attempting the various solutions 180. The resource usage monitor 212 uses the submitted triage reports 190 to identify how long and how many of the one or more deployment systems 121 and developer system 130 were unavailable to perform other tasks while performing each solution 180 indicated in the triage report 190. For example, a solution 180 to ping each individual server in a computing deployment 120 and restart every server that does not return a response affects N non-responsive servers and makes those N servers unavailable during the time $t_1$ needed to reboot those servers. In another example, a solution 180 to ping a network element (e.g., a router or bridge) that serves M servers and reset that network element when a response is not returned affects all M servers, which are unavailable during the reboot time $t_2$ for that network element. If either of the two example solutions 180 can resolve the same error 150, the different resource usages of $N*t_1$ downtime and $M*t_2$ downtime are relevant factors for the search model 210 to determine which solution 180 to propose to a developer experiencing a similar error. Accordingly, the resource usage monitor 212 provides semi-supervised feedback to train the search model 210 to identify when various solutions 180 are more or less resource intensive in resolving various errors affecting the computing deployments 120 with associated configuration data.

Because the triage probe 110 may have incomplete knowledge of the configuration 170 of the affected computing deployment 120 (or the historical configurations from the previously affected computing deployments), the use of these resources in performing an associated solution 180 may not guarantee successful resolution of the underlying error 150. Therefore, the search model 210 does not use the resource usage monitor 212 to merely identify a resolution pathway from the lowest resource usage to the highest resource usage to thereby improve computing efficiency when resolving the error 150, but as one factor in evaluating what solutions 180 to recommend the developer to attempt, and in what order.

Because the success rate monitor 211 and the resource usage monitor 212 identify potentially competing metrics for how to identify and rank the solutions 180 to suggest to resolve an error 150, and the individual developers may place different emphasis on these competing metrics, the search model 210 includes a weight adjustor 213 to re-weight or adjust the order of preference for recommending various solutions 180.

For example, when a first solution 180 is successful A % of the time (for a given configuration 170 to resolve a given error 150) and has a resource usage of $N*t_1$, and a second solution 180 is successful B % of the time (for resolving the same error 150 in a given configuration 170) and has a resource usage of $M*t_2$, the search model 210 can identify whether to suggest an order of attempting the two solutions 180 or whether to omit suggesting one or more of the solutions 180 before deciding to escalate the error 150 to an escalation service to resolve. These suggestions can be based on different preferences that different developers have, the different configurations 170 of the respective computing deployments 120, and combinations thereof.

For example, a first developer may have different preferences or tolerances than a second developer for relative success rates or resource usage in the solutions 180 to select for resolving an error 150 based on the number of test environments available to each developer, the relative values of N and M, A and B, $t_1$ and $t_2$, and combinations thereof. In this example, the first developer has access to multiple test environments may continue developing in a separate test environment while one test environment is locked to resolve the error 150 (e.g., on a separate branch of the code under test 160). In contrast, the second developer in this example has access to a single test environment, and is blocked from further development when the single test environment is locked for error resolution. Accordingly, the second developer may place greater emphasis on reducing resource usage, and may invoke the escalation service sooner than the first developer. In contrast, the first developer in this example can prefer a more thorough analysis and exploration of the resolution pathway before invoking the escalation service. Therefore, the weights adjustor 213 may select different (and fewer) solutions 180 from the solution database 140 for a resolution pathway designed for the second developer than for the first developer for a similar error 150 occurring in a similar computing deployment 120.

Additionally, the weight adjustor 213 accounts for new solutions 220 that lack historic success rates or associated resource usage data, as the new solution 220 (by virtue of being new) is absent from previously collected triage reports 190. In some examples, the weights adjustor 213 provides an estimated success rate and resource usage to suggest the new solution 220 over historic solutions 180 (with known success rates and resource usage data) the next time a similar error is reported. Individual developers may set different initial weighting adjustments for the weights adjustor 213 to apply to new solutions 220 received from different sources (e.g., a first weight for a new solution 220 from a first escalation service, a second weight for a new solutions from a second escalation service, etc.). Additionally or alternatively, the escalation service may supply suggested initial values for the success rate and resource usage to be used by the search model 210, which the weights adjustor 213 may accept or modify based on learned past experience or specified user preferences.

In various examples, the new solution 220 may match a historic solution 180 in the solution database 140 that the triage report 190 indicates (by omission) that the developer did not attempt when trying to resolve the error 150. Accordingly, the weights monitor 213 can identify that the new solution 200 matches and already known solution to increase the weight of the corresponding historic solution 180 and thereby provide a greater likelihood for recommendation that historic solution 180 when a similar error is next detected.

Figure 3A:
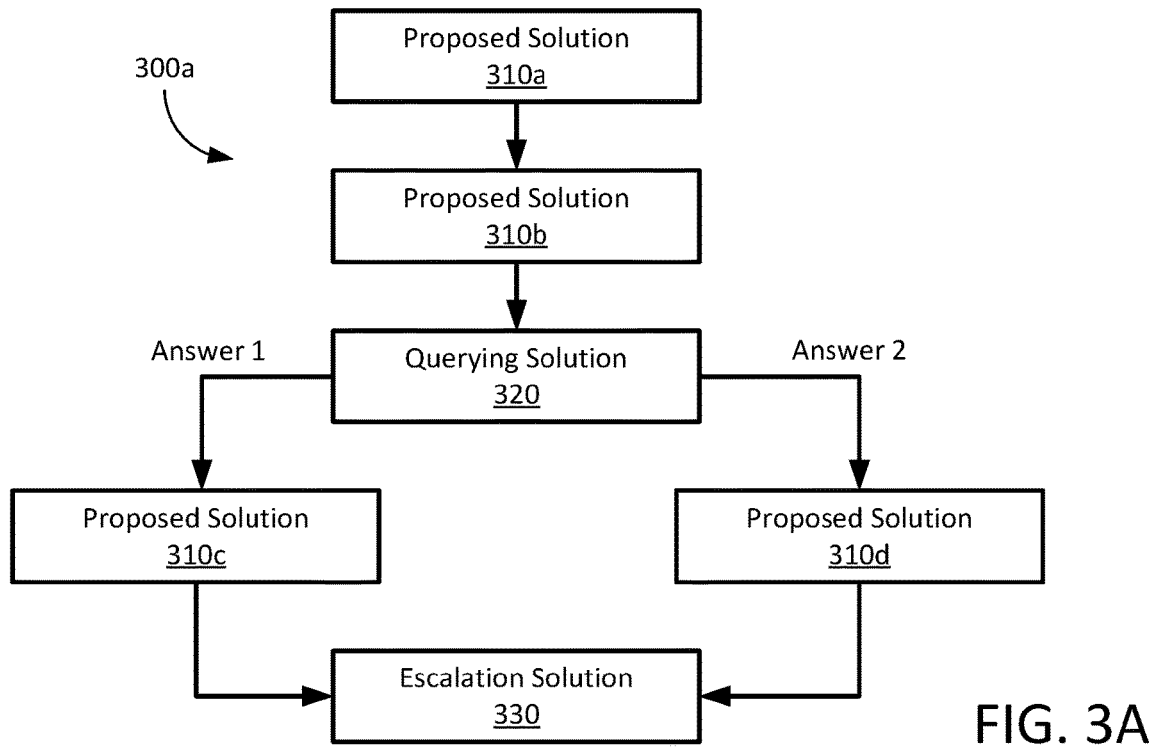
FIGS. 3A and 3B illustrate resolution pathways, according to various examples of the present disclosure.
Figure 3B:
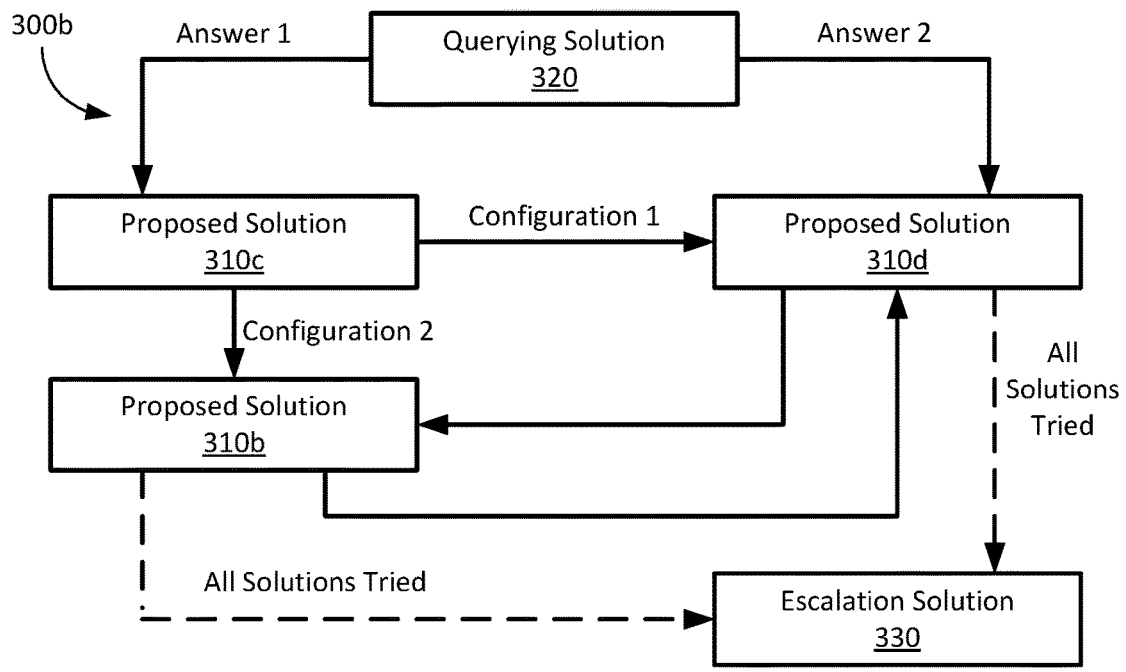

FIGS. 3A and 3B illustrate resolution pathways 300*a-b* (generally or collectively, resolution pathway 300), according to various examples of the present disclosure. In various examples, FIG. 3A represents an initial resolution pathway 300*a* that the subsequent resolution pathway 300*b* in FIG. 3B is developed from using an updated machine learning model, trained from the results of resolving the error 150 according to the first resolution pathway 300*a*. Additionally or alternatively, the resolution pathways 300*a-b* may be different from one another due to different developer preferences or criteria in attempting to resolve the error 150 used to generate the respective resolution pathways 300.

Each of the resolution pathways 300 illustrated in FIGS. 3A and 3B reference the same proposed solutions 310*a-f* (generally or collectively, proposed solution 310), a querying solution 320, and an escalation solution 330. The flow among the various solutions 310-330 of the resolution pathways 300 proceeds while the error 150 remains unresolved or the escalation solution 330 is reached, but concludes on successful resolution of the error 150. For example, if the first proposed solution 310a in FIG. 3A successfully resolves the error 150, the first resolution pathway 300a may conclude without proceeding to the second proposed solution 310b. However, if none of the proposed solutions 310a-d resolve the error 150, the escalation solution 330 concludes the resolution pathway 300 by transmitting a triage report 190 to an escalation service to identify a new solution 220 for resolving the error 150.

As each proposed solution 310 is attempted and performed on the computing deployment 120, the proposed solution 310 is appended to the triage report 190. Additionally, as additional information related to the computing deployment 120 is learned through the results of unsuccessful proposed solutions 310 or replies to querying solutions 320, these additional configuration data may be appended to the triage report 190.

The proposed solutions 310 represent historic solutions 180 that a developer can select to perform on the computing deployment 120 to attempt to resolve the error 150. The querying solutions 320 represent historic solutions 180 (or sub-steps in the historic solutions 180) that request additional information from the developer or from the computing deployment 120 to branch to different subsequent elements in the resolution pathway 300. For example, the querying solution 320 (while the error 150 remains unresolved) advances to the third proposed solution 310c when the developer provides a first answer, but advances to the fourth proposed solution 310d when the developer provides a second answer.

Similarly, when the triage probe 110 already knows the configuration data needed to branch the pathway (or learns of the configuration data from earlier responses), the resolution pathway 300 can include a branching proposed solution 310 that proceeds to different subsequent proposed solutions 310 without requesting additional information from the developer or the computing deployment 120. For example, in the second resolution pathway 300b the error resolution pathway can proceed from the third proposed solution 310c to either the fourth proposed solution or the second proposed solution 310b based on an already known configuration matching a first or a second configuration, respectively.

Although shown with two branching alternatives, in other examples, a solution can branch to various numbers of alternatives based on various responses or known configurations.

As illustrated in FIG. 3A, the first resolution pathway 300a begins with the first proposed solution 310a, the second proposed solution 310b, and the querying solution 320 in sequence, and proceeds to one of the third proposed solution 310c or the fourth proposed solution 310d based on an answer to the querying solution 320, and then concludes with the escalation solution 330 if the error 150 remains unresolved after the third proposed solution 310c or the fourth proposed solution 310d is attempted.

As illustrated in FIG. 3B, the second resolution pathway 300b begins with the querying solution 320, and proceeds to one of the third proposed solution 310c or the fourth proposed solution 310d based on an answer to the querying solution 320. The second resolution pathway 300b proceeds from the third proposed solution 310c to either the fourth proposed solution 310d or the second proposed solution 310b based on the configuration status of the computing deployment 120 known to the triage probe 110. The second resolution pathway 300b proceeds from the fourth proposed solution 310d to either the second proposed solution 310b or the escalation solution 330 based on whether the triage probe has already attempted the second proposed solution 310b. Similarly, the second resolution pathway 300b proceeds from the second proposed solution 310b to either the fourth proposed solution 310d or the escalation solution 330 based on whether the triage probe has already attempted the fourth proposed solution 310d.

The first proposed solution 310a is omitted from the second resolution pathway 300b, and may be omitted for different reasons in different examples. In various examples, the triage probe 110 may omit the first proposed solution 310a when identifying a resolution pathway 300 when the first proposed solution 310a is observed as having a success rate below a efficacy threshold, an escalation service or subject matter expert has identified a replacement for the first proposed solution 310a, the first proposed solution 310a is observed as having resource usage above a consumption threshold, the first proposed solution 310a is extraneous to reaching a resolution threshold within a resource usage limit, or combinations thereof.

In various examples, a developer can set the efficacy threshold (e.g., successful in at least X % of attempts, attempted at least Y number of times), the consumption threshold (e.g., causing no more than X seconds of downtime, affecting no more than Y systems at a given time, not affecting systems of type Z), and combinations thereof to include or exclude a proposed solution 310 from a resolution pathway 300. The developer can also set a resolution threshold to reach within a resource usage limit (e.g., solves the error for at least X % of the historic user set with no more than Y seconds of downtime) to identify various combinations of two or more proposed solutions 310 that meet the specified criteria.

For example, consider if the first proposed solution 310a is successful 10% of the time and causes X seconds of downtime, the second proposed solution 310b is successful 20% of the time and causes 2× seconds of downtime, third proposed solution 310c is successful 25% of the time and causes 3× seconds of downtime, and the fourth proposed solution is successful 40% of the time and causes 4× seconds of downtime, and the developer has specified that a successful solution should be found historically at least 60% of the time using no more than 6× seconds of downtime over the course of the resolution pathway 300. In this example scenario, there is no resolution pathway 300 where the first proposed solution 310a can be combined with the other proposed solutions 310b-d to reach the resolution threshold (60%) without exceeding the resource usage limit (6× seconds). Accordingly, the first proposed solution 310a is an extraneous solution under these example criteria, and may be omitted from a resolution pathway 300 despite potentially be effective in resolving the error 150.

Continuing the example, the triage probe 110 may recommend either the third proposed solution 310c or the second proposed solution 310b be combined with the fourth proposed solution 310d to produce a resolution pathway 300 that meets the resolution threshold (at least 60%) without exceeding the resource usage limit (6× seconds or less). In various examples, the triage probe 110 may include a query solution 320 to determine or collect additional configuration data to identify if the resolution rates can be further refined (e.g., a proposed solution 310 is generally successful X % of the time for the currently known configuration, but is Y % successful in a specific subset of the configurations, where X≠Y). Otherwise, the triage probe 110 can select the potential option having the highest currently known success rate, lowest resource usage, or combination thereof for inclusion in the resolution pathway 300.

Figure 4:
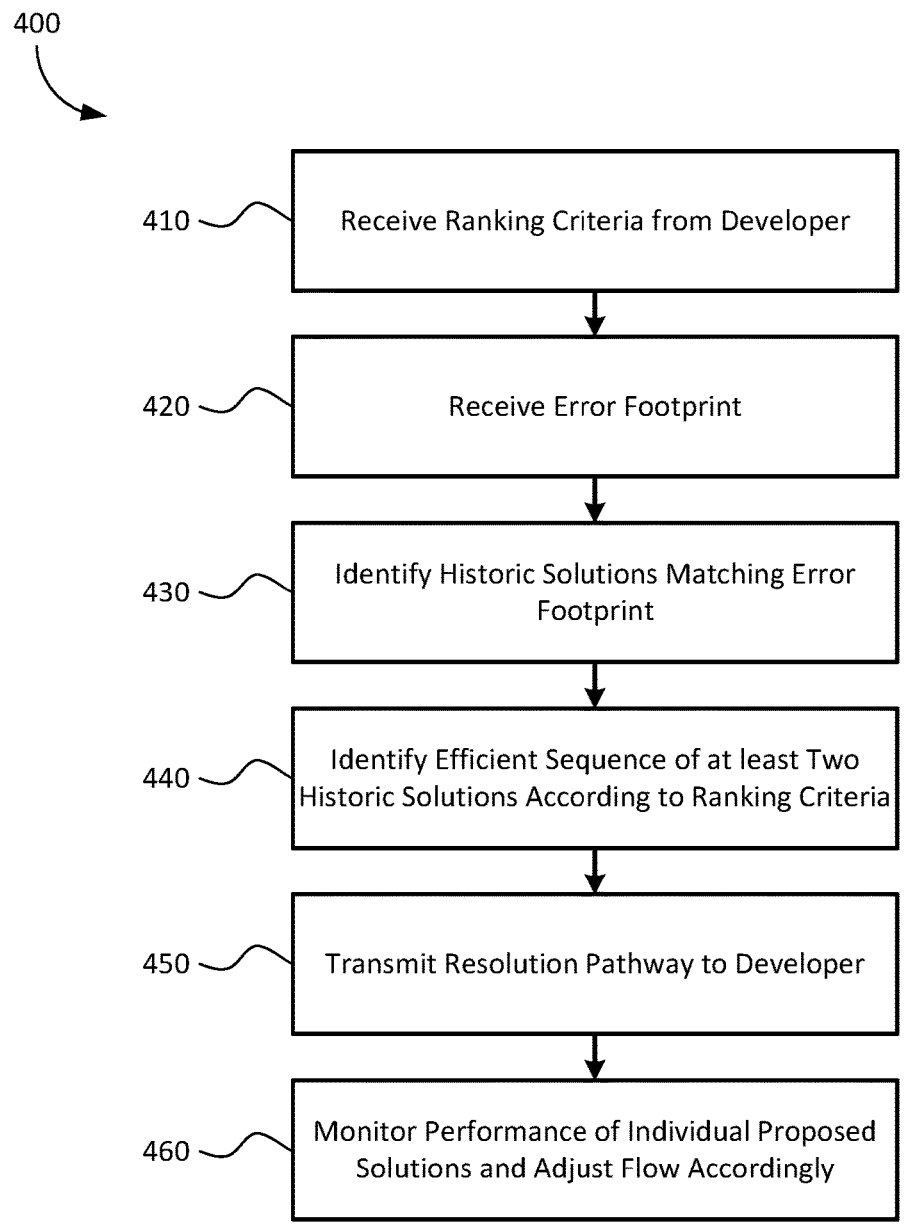
FIG. 4 is a flowchart of an example process for developing resolution pathways, according to examples of the present disclosure.

FIG. 4 is a flowchart of an example process 400 for developing resolution pathways 300, according to examples of the present disclosure. Process 400 begins with block 410, where the triage probe 110 receives ranking criteria from a developer for how to prioritize different historic solutions 180 for selection as proposed solutions 310 in a resolution pathway 300 for that developer. For example, the triage probe 110 may receive values or relative preferences for an efficacy threshold or a consumption threshold to consider an individual historic solution 180 or a resolution threshold for an associated resource usage limit to consider combinations of historic solutions 180 for use in a resolution pathway 300. Accordingly, different developers may receive different resolution pathways 300 (which may include some or all of the same proposed solutions 310) to resolve the same error 150 when different ranking criteria are provided. These different resolution pathways 300 can be identified by a machine learning model to handle error resolution in a computing deployment 120 for which incomplete configuration data are known, and to continually improve which solutions 180 are presented (and in what order) to developers detecting similar errors.

At block 420, the triage probe 110 receives an error footprint, including an identifier or classifier for the error 150 and at least some data of the configuration 170 of the computing deployment 120 affected by the error 150. In various examples, the configuration data provided to the triage probe 110 may be incomplete, and the identifier or classifier may include a specific error code or a general description of the error 150 (e.g., as a user-provided natural language description).

At block 430, the triage probe 110 uses a machine learning mode, such as the search model 210, to identify a plurality of historic solutions 180 to historic errors matching the error footprint, that occurred in historic computing deployments with historic configuration data that at least partially match the (potentially) incomplete configuration data for the computing deployment 120, and at least partially match the identified error.

At block 440, the triage probe 110 identifies an efficient sequence to attempt at least two solutions of the plurality of historic solutions 180 according to the ranking criteria received per block 410. In various examples, the triage probe 110 uses the supplied ranking criteria to identify which metrics the developer wishes to emphasize when building a resolution pathway 300 (e.g., a more thorough but potentially more computationally expensive pathway, a pathway that attempts quick-to-try solutions over resource intensive solutions, etc.) and selects the individual proposed solutions 310 and query solutions 320, and the order to arrange those solutions in the resolution pathway 300.

At block 450, the triage probe 110 transmits the resolution pathway 300 to the developer to enact (or approve for the triage probe 110 to enact) the proposed solutions 310 in the order indicated. In various examples, the triage probe 110 sends each proposal individually in response to an earlier proposed solution 310 being unsuccessful in resolving the error 150. In some examples, the triage probe 110 sends the entire resolution pathway 300 to the developer to enact without further input from the triage probe 110 until the triage report 190 is generated.

At block 460, the triage probe 110 monitors performance of the individual proposed solutions 310 and adjust the flow through the resolution pathway 300 accordingly. As the computing deployment 120 or the developer perform the indicated solutions on the computing deployment 120, the machine learning model may update or re-determine which historic solution 180 to propose next until the error 150 is resolved or a resource usage threshold is reached (e.g., cause no more than X seconds of downtime, try no more than Y proposed solutions 310). In various examples, monitoring performance of the individual proposed solutions includes gathering the details from the triage report 190 to update the machine learning model to recognize new or more-efficient resolution pathways 300 the next time a similar error is reported.

Figure 5:
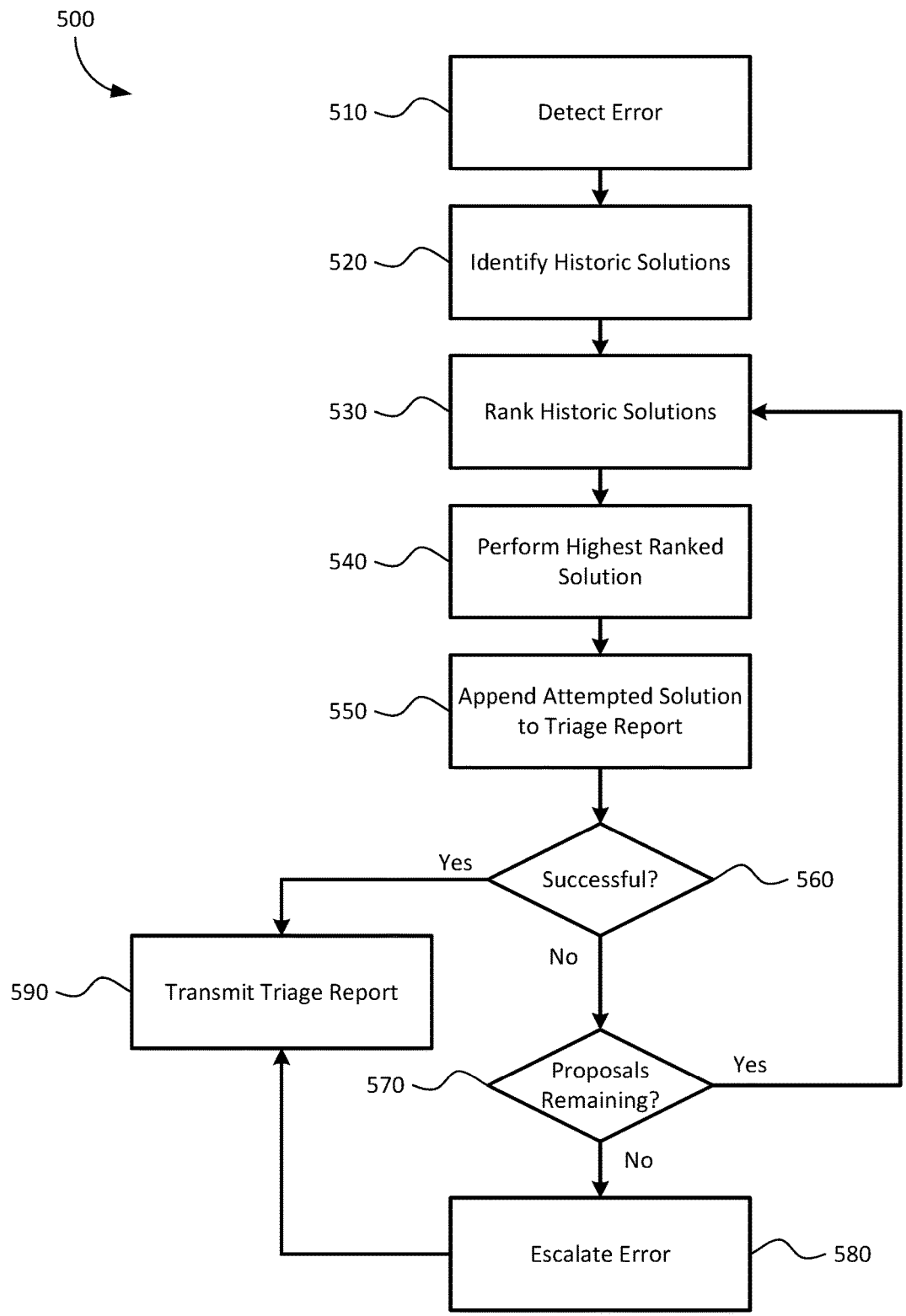
FIG. 5 is a flowchart of an example process for triaging an error in a computing deployment, according to various examples of the present disclosure.

FIG. 5 is a flowchart of an example process 500 for triaging an error 150 in a computing deployment 120, according to various examples of the present disclosure. Process 500 begins with block 510, where the triage probe 110 detects the error 150 in the computing deployment 120 or is otherwise invoked to help resolve the error 150.

At block 520, the triage probe 110 identifies historic solutions 180 to resolve the error 150. In various examples, the triage probe 110 identifies relevant historic solutions 180 from a solution database 140 that are associated with various historic success rates and resource usage amounts based on previous attempts to perform the historic solutions 180. The triage probe 110 may ignore or otherwise remove from consideration historic solutions 180 that are not for the same error type as the error 150 (detected per block 510) or historic solutions 180 that were performed in historic computing deployments that do not share various characteristics with the computing deployment 120 from which the error 150 (per block 510) was detected.

At block 530, the triage probe 110 ranks the historic solutions 180 and identifies the highest ranked historical solution 180 to recommend for resolving the error 150. In various examples, the triage probe 110 ranks the available historic solutions 180 based on one or more of a historic success rate for resolving the historic errors, historic resource usage in attempting the historic solutions 180, whether the historic solution 180 is indicated as a new solution 220 to a previously unresolved error, or the like. Various developers may set different weightings for the potentially competing analysis factors to specify different factors or thresholds to consider when ranking the available historic solutions 180.

Because the triage probe 110 may initially begin the triage process with incomplete information about the error 150 or the configuration 170 of the affected computing deployment 120, process 500 may return to block 530 after additional information is collected (e.g., from block 570). When additional information has been collected about the configuration 170 or the error 150, the triage probe 110 may re-rank the historic solutions 180 to provide a different historic solution 180 to recommend. For example, when the initial highest ranked solution 180 is the querying solution 320 from FIG. 3B, the triage probe 110 receives an answer that provides additional information about the error 150 or the configuration 170, which determines whether to proceeds to the third proposed solution 310c or the fourth proposed solution 310d as the next solution 180 to recommend.

Otherwise, when process 500 returns to block 530 without having collected new information, the triage probe 110 may use the previous ranking and select the second-highest (or subsequent-highest) ranked solution 180 as the next historic solution 180 to attempt. For example, when the initial highest ranked solution 180 is the first proposed solution 310a from FIG. 3A, the triage probe 110 may receive no additional information (beyond the success or failure of the first proposed solution 310*a*) before recommending the subsequent highest ranked solution of the second proposed solution 310*b*

At block 540, the triage probe 110 performs the highest ranked historical solution 180 on the computing deployment 120 to attempt to resolve the error 150. For example, when the highest ranked historical solution is to determine whether a server is responsive or experiencing network difficulties, the triage probe 110 may ping the server in question.

At block 550, the triage probe 110 appends the attempted solution (per block 540) to a triage report 190, regardless of whether the error 150 was resolved. In various embodiments, the order of the attempted solutions 180 is maintained by the triage report 190, and any additional information regarding the error 150 or the configuration 170 gained from performing the highest ranked historical solution 180 is also added to the triage report 190.

At block 560, the triage probe 110 determines whether the attempted solution (per block 540) was successful in resolving the error 150. When the solution was successful, process 500 proceeds to block 590. Otherwise, when the solution was unsuccessful, process 500 proceeds to block 570.

At block 570, the triage probe 110 determines whether any proposals for historic solutions 180 to resolve the error 150 remain. When the additional historic solutions 180 that have not yet been attempted (or otherwise ruled out for attempting) are available, process 500 returns to block 530 to reevaluate any additional information gained about the computing deployment 120. In various examples, the triage probe 110 rules a historic solution 180 to ruled unavailable for attempting when a resource usage threshold is reached (e.g., the computing deployment 120 has been engaged in error resolution for X seconds, Y solutions have been attempted, etc.), when a mutually exclusive or duplicative historic solution 180 has already been attempted (e.g., a hard reboot vs. a soft reboot), or a developer rejects or prohibits performance of that historic solution 180. When no further historic solutions 180 are available, process 500 proceeds to block 580.

At block 580, the triage probe 110 identifies an escalation service to escalation resolution of the error 150 to. In some examples, an escalation service can include various third parties with control over elements of the computing deployment 120 outside of the developer's control, such as a cloud service provider in control of a data center in which the computing deployment 120 is provided. Additionally or alternatively, an escalation service can include various third parties with greater knowledge or understanding than the developer of the systems or software used in the computing deployment 120, such as an original equipment manufacturer, a subject matter expert, an external troubleshooting service, a third-party developer of a library or software package, or combinations thereof) to send the triage report 190 to, so that the escalation service can analyze the computing deployment 120 and the error 150 to develop a new solution 220 to attempt to resolve the error 150.

At block 590, the triage probe 110 transmits the triage report 190. The triage report 190 identifies the historic solution(s) 180 attempted, which of the historic solution(s) 180 were successful or unsuccessful, an order in which the historic solution(s) 180 were attempted, various configuration data for the computing deployment 120 and when those configuration data were learned by the triage probe 110. In various examples, the triage probe 110 transmits the triage report 190 to the solution database 140 for updating the machine learning model used by the triage probe 110 to identify and recommend relevant historic solutions 180 and to the developer using the triage probe 110, which serves as a report for the error resolution process. Additionally, in examples where the error resolution process concluded with a determination to escalate the error 150 to an escalation service to resolve, the triage probe 110 transmits the triage report 190 to the one or more escalation services identified in block 580. Process 500 may then conclude.

Figure 6:
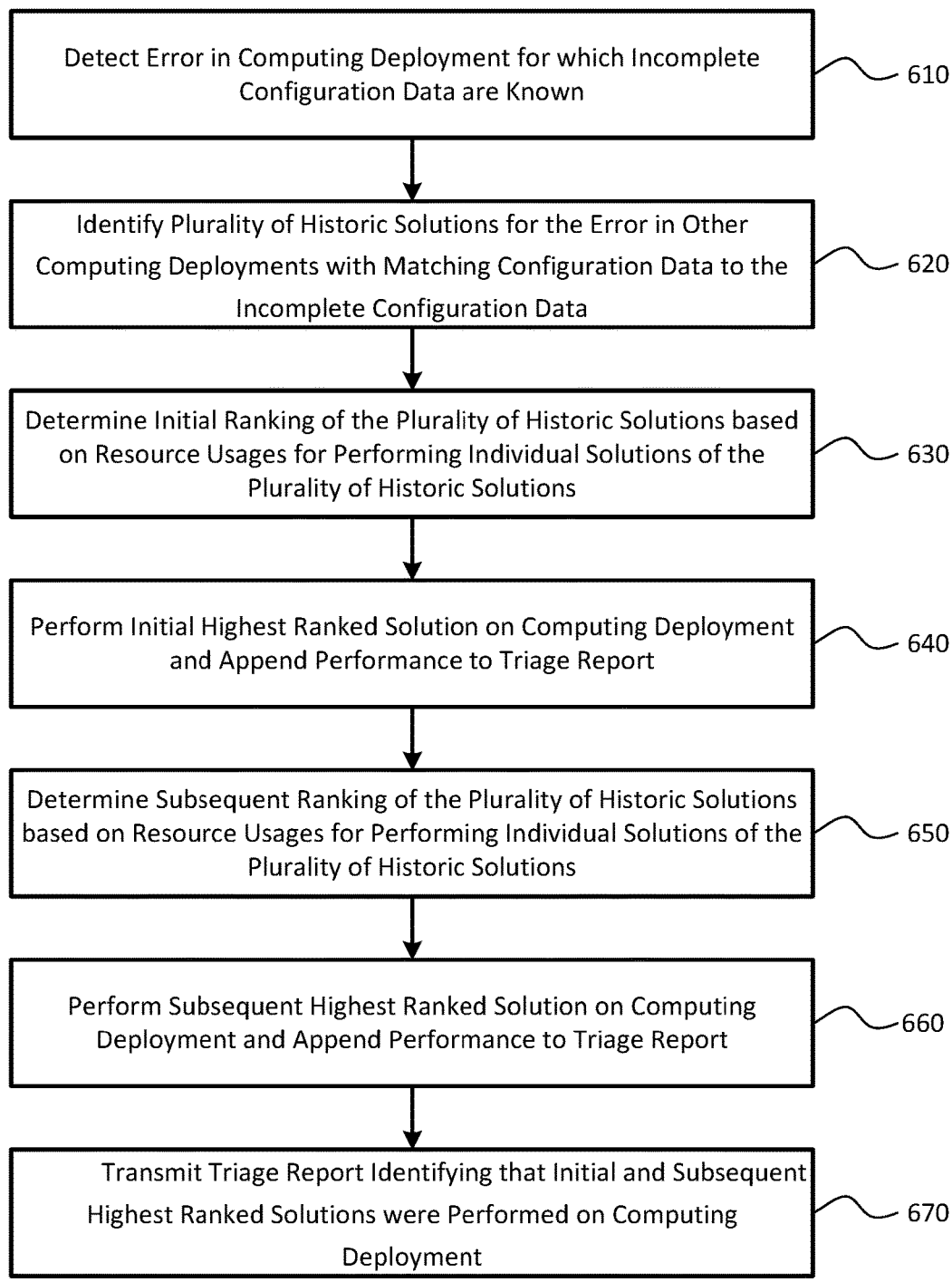
FIG. 6 is a flowchart of an example process for triaging an error in a computing deployment, according to various examples of the present disclosure.

FIG. 6 is a flowchart of an example process 600 for triaging an error 150 in a computing deployment 120, according to various examples of the present disclosure. Process 600 begins at block 610, in response to a triage probe 110 detecting an error 150 in a computing deployment 120 for which incomplete configuration data are known. In some examples, the triage probe 110 locks the configuration 170 of the computing deployment 120 in response to detecting the error 150 so that the historic solutions 180 are performed on a computing deployment 120 that does not change configuration 170 from attempt to attempt.

At block 620, the triage probe 110 identifies a plurality of historic solutions 180 for the error 150 that were observed in other computing deployments with matching configuration data to the incomplete configuration data known for the computing deployment 120. In various examples, the plurality of historic solutions 180 for the error 150 are stored in a solution database 140 that the machine learning model retrieves based (at least in part) on an error identity, a system in the computing deployment 120 affected by the error 150, and a configuration 170 of the computing deployment 120 when the error 150 occurred.

At block 630, a machine learning model for the triage probe 110 determines an initial ranking of the plurality of historic solutions 180 based (at least in part) on resource usages for performing each of the individual solutions of the plurality of historic solutions 180. The machine learning model for the triage probe 110 may also rank the plurality of historic solutions 180 according to historic resolution rates so that historic solutions 180 with higher success rates (ceteris paribus) are ranked higher than historic solutions with lower success rates. However, a first solution 180 of the plurality of historic solutions 180 would be ranked lower in the initial ranking than a second solution 180 of the plurality of historic solutions 180 despite the first solution historically resolving the error 150 more often than the second solution 180 resolves the error 150 based on a first resource usage for attempting the first solution 180 exceeding a second resource usage for attempting the second solution 180.

At block 640, the triage probe 110 performs an initial highest ranked solution, according to the initial ranking, on the computing deployment 120, and appends performance of the initial highest ranked solution to a triage report 190. For example, when the initial highest ranked historical solution is to determine whether a server is responsive or experiencing network difficulties, the triage probe 110 may ping the server in question. The triage probe 110 then appends the attempted action (performing a ping) and the results thereof (e.g., no response within a response window) to the triage report 190.

At block 650, in response to determining that the initial highest ranked solution was unsuccessful in resolving the error, the machine learning model for the triage probe 110 determines a subsequent ranking of the plurality of historic solutions 180 for the error 150 based (at least in part) on the resource usages for performing the individual solutions 180 of the plurality of historic solutions 180. In various examples, in response to determining that the initial highest ranked solution was unsuccessful in resolving the error 150, the triage probe 110 transmits a query to the developer or the computing deployment 120 for additional information to supplement the incomplete configuration data exposed by attempting the initial highest ranked solution 180. In various examples, when additional configuration data are exposed, the subsequent ranking can reorder which historic solution 180 is recommended to attempt next, such that a subsequent highest ranked solution 180 according to the subsequent ranking is not a second-highest ranked solution 180 according to the initial ranking.

At block 660, the triage probe 110 performs a subsequent highest ranked solution, according to the subsequent ranking, on the computing deployment 120, and appends performance of the subsequent highest ranked solution to a triage report 190. For example, when the initial highest ranked historical solution was to determine whether a server is responsive or experiencing network difficulties, and the server did not provide a response, the subsequent highest ranked solution may be to attempt to ping another server in the computing deployment 120 to determine how the networking error is localized. In this example, the triage probe 110 may ping the different server, and then appends the attempted action (performing the subsequent ping) and the results thereof (e.g., a response within a response window) to the triage report 190.

At block 670, the triage probe 110 transmits the triage report 190 to an escalation service and/or a solution database 140. The triage report 190 identifies that the initial highest ranked solution 180 and the subsequent highest ranked solution 180 were performed on the computing deployment 120 as well as whether the solutions 180 resolved the error 150 and other configuration data related to the computing deployment 120. When the triage report 190 is sent to an escalation service, the triage probe 110 receives a new solution 220 from the escalation service to apply to resolve the error 150 in the computing deployment 120, which is added to the plurality of historic solutions 180 for later analysis in response to detecting a subsequent error. Process 600 may then conclude.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the examples described herein will be apparent to those skilled in the relevant art. Such changes and modifications can be made without departing from the spirit and scope of the present subject matter and without diminishing its intended advantages. It is therefore intended that such changes and modifications be covered by the appended claims.

What is claimed is:

1. A method, comprising:
    detecting an error to triage in a computing deployment for which incomplete configuration data are known;
    identifying a plurality of historic solutions for the error in other computing deployments with matching configuration data to the incomplete configuration data;
    determining, via a machine learning model, an initial ranking of the plurality of historic solutions based at least in part on resource usages for performing individual solutions of the plurality of historic solutions;
    performing an initial highest ranked solution, according to the initial ranking, on the computing deployment;
    appending performance of the initial highest ranked solution to a triage report;
    in response to determining that the initial highest ranked solution was unsuccessful in resolving the error, determining, via the machine learning model, a subsequent ranking of the plurality of historic solutions for the error based at least in part on the resource usages for performing the individual solutions of the plurality of historic solutions;
    performing a subsequent highest ranked solution, according to the subsequent ranking, on the computing deployment;
    appending performance of the subsequent highest ranked solution to the triage report; and
    transmitting the triage report identifying that the initial highest ranked solution and the subsequent highest ranked solution were performed on the computing deployment; and
    in response to detecting the error:
        locking a configuration of the computing deployment during attempts to apply historic solutions of the plurality of historic solutions, wherein the triage report further identifies the configuration of the computing deployment.

2. The method of claim 1, wherein determining that the initial highest ranked solution was unsuccessful in resolving the error further comprises:
    transmitting a query for additional information to supplement the incomplete configuration data.

3. The method of claim 1, wherein the subsequent highest ranked solution is not a second-highest ranked solution according to the initial ranking.

4. The method of claim 1, wherein determining the initial ranking further comprises:
    ranking a first solution of the plurality of historic solutions lower in the initial ranking than a second solution of the plurality of historic solutions when the first solution historically resolves the error more often than the second solution resolves the error based on a first resource usage for attempting the first solution exceeding a second resource usage for attempting the second solution.

5. The method of claim 1, wherein the plurality of historic solutions for the error are stored in a solution database that the machine learning model retrieves based at least in part on an error identity, a system in the computing deployment affected by the error, and a configuration of the computing deployment when the error occurred.

6. The method of claim 1, further comprising, in response to determining that the subsequent highest ranked solution was unsuccessful in resolving the error:

sending the triage report to an escalation service;
receiving a new solution from the escalation service; and
adding the new solution to the plurality of historic solutions for analysis in response to detecting a subsequent error.

7. A memory device including instructions that when executed by a processor perform operations comprising:
   detecting an error to triage in a computing deployment for which incomplete configuration data are known;
   identifying a plurality of historic solutions for the error in other computing deployments with matching configuration data to the incomplete configuration data;
   determining, via a machine learning model, an initial ranking of the plurality of historic solutions based at least in part on resource usages for performing individual solutions of the plurality of historic solutions;
   performing an initial highest ranked solution, according to the initial ranking, on the computing deployment;
   appending performance of the initial highest ranked solution to a triage report;
   in response to determining that the initial highest ranked solution was unsuccessful in resolving the error, determining, via the machine learning model, a subsequent ranking of the plurality of historic solutions for the error based at least in part on the resource usages for performing the individual solutions of the plurality of historic solutions;
   performing a subsequent highest ranked solution, according to the subsequent ranking, on the computing deployment;
   appending performance of the subsequent highest ranked solution to the triage report; and
   transmitting the triage report identifying that the initial highest ranked solution and the subsequent highest ranked solution were performed on the computing deployment; and
   in response to detecting the error:
      locking a configuration of the computing deployment during attempts to apply historic solutions of the plurality of historic solutions, wherein the triage report further identifies the configuration of the computing deployment.

8. The memory device of claim 7, wherein determining that the initial highest ranked solution was unsuccessful in resolving the error further comprises:
   transmitting a query for additional information to supplement the incomplete configuration data.

9. The memory device of claim 7, wherein the subsequent highest ranked solution is not a second-highest ranked solution according to the initial ranking.

10. The memory device of claim 7, wherein determining the initial ranking further comprises:
    ranking a first solution of the plurality of historic solutions lower in the initial ranking than a second solution of the plurality of historic solutions when the first solution historically resolves the error more often than the second solution resolves the error based on a first resource usage for attempting the first solution exceeding a second resource usage for attempting the second solution.

11. The memory device of claim 7, wherein the plurality of historic solutions for the error are stored in a solution database that the machine learning model retrieves based at least in part on an error identity, a system in the computing deployment affected by the error, and a configuration of the computing deployment when the error occurred.

12. The memory device of claim 7, the operations further comprising, in response to determining that the subsequent highest ranked solution was unsuccessful in resolving the error:
    sending the triage report to an escalation service;
    receiving a new solution from the escalation service; and
    adding the new solution to the plurality of historic solutions for analysis in response to detecting a subsequent error.

13. A system, comprising:
    a processor in communication with a solution database; and
    a memory device including instructions that when executed by the processor perform operations comprising:
       detecting an error to triage in a computing deployment for which incomplete configuration data are known;
       identifying, from the solution database, a plurality of historic solutions for the error in other computing deployments with matching configuration data to the incomplete configuration data;
       determining, via a machine learning model, an initial ranking of the plurality of historic solutions based at least in part on resource usages for performing individual solutions of the plurality of historic solutions;
       performing an initial highest ranked solution, according to the initial ranking, on the computing deployment;
       appending performance of the initial highest ranked solution to a triage report;
       in response to determining that the initial highest ranked solution was unsuccessful in resolving the error, determining, via the machine learning model, a subsequent ranking of the plurality of historic solutions for the error based at least in part on the resource usages for performing the individual solutions of the plurality of historic solutions;
       performing a subsequent highest ranked solution, according to the subsequent ranking, on the computing deployment;
       appending performance of the subsequent highest ranked solution to the triage report; and
       transmitting the triage report identifying that the initial highest ranked solution and the subsequent highest ranked solution were performed on the computing deployment; and
       in response to detecting the error:
          locking a configuration of the computing deployment during attempts to apply historic solutions of the plurality of historic solutions, wherein the triage report further identifies the configuration of the computing deployment.

14. The system of claim 13, wherein determining that the initial highest ranked solution was unsuccessful in resolving the error further comprises:
    transmitting a query for additional information to supplement the incomplete configuration data.

15. The system of claim 13, wherein the subsequent highest ranked solution is not a second-highest ranked solution according to the initial ranking.

16. The system of claim 13, wherein determining the initial ranking further comprises:
    ranking a first solution of the plurality of historic solutions lower in the initial ranking than a second solution of the plurality of historic solutions when the first solution historically resolves the error more often than the second solution resolves the error based on a first resource usage for attempting the first solution exceeding a second resource usage for attempting the second solution.

17. The system of claim 13, wherein the plurality of historic solutions for the error are stored in a solution database that the machine learning model retrieves based at least in part on an error identity, a system in the computing deployment affected by the error, and a configuration of the computing deployment when the error occurred.

18. The system of claim 13, further comprising, in response to determining that the subsequent highest ranked solution was unsuccessful in resolving the error:
   sending the triage report to an escalation service;
   receiving a new solution from the escalation service; and
   adding the new solution to the plurality of historic solutions for analysis in response to detecting a subsequent error.

\* \* \* \* \*